United States Patent [19]

Casper et al.

[11] Patent Number: 5,164,030

[45] Date of Patent: Nov. 17, 1992

[54] CONTINUOUS PROCESS FOR THE SEPARATION OF SOLUTIONS AND SUSPENSIONS

[75] Inventors: Clemens Casper; Jörgen Weinschenck, both of Krefeld, Fed. Rep. of Germany

[73] Assignee: Bayer Aktiengesellschaft, Fed. Rep. of Germany

[21] Appl. No.: 673,727

[22] Filed: Mar. 22, 1991

[30] Foreign Application Priority Data

Apr. 7, 1990 [DE] Fed. Rep. of Germany ..... 40111382

[51] Int. Cl.$^5$ ............................................... B01D 1/00
[52] U.S. Cl. .................................... 159/47.1; 159/2.1; 159/25.1; 159/26.2; 159/28.4; 159/DIG. 13; 203/88; 528/501
[58] Field of Search ...................... 159/47.1, 2.1, 25.1, 159/26.2, 28.4, 43.1, DIG. 13; 203/7, 88, 99; 34/184, 166; 528/501

[56] References Cited

U.S. PATENT DOCUMENTS

| | | | |
|---|---|---|---|
| 2,868,280 | 1/1959 | Sargent et al. | 159/47.1 |
| 3,105,021 | 9/1963 | Randall | 202/160 |
| 3,234,994 | 2/1966 | Dance | 159/47.1 |
| 3,453,184 | 7/1969 | Gemassmer et al. | 159/2.1 |
| 3,986,975 | 10/1976 | Bayer et al. | 159/9.2 |
| 4,138,310 | 2/1979 | Kalka et al. | 159/47.1 |
| 4,184,911 | 1/1980 | Koda et al. | 159/47.1 |
| 4,400,236 | 8/1983 | Hanamura et al. | 159/47.1 |
| 4,430,156 | 2/1984 | Casper et al. | 159/47.1 |
| 4,981,554 | 1/1991 | Loconsolo et al. | 202/237 |
| 4,990,222 | 2/1991 | Aigner et al. | 159/47.1 |

OTHER PUBLICATIONS

Ullmann 1951, pp. 536 and 537.

*Primary Examiner*—Virginia Manoharan
*Attorney, Agent, or Firm*—Connolly & Hutz

[57] ABSTRACT

In the thermal separation of solutions and suspensions into a free-flowing solid and into a largely solid-free distillate, the useful product can be almost completely recovered in a pure state, and the amount of waste product can thus be reduced, by carrying out the concentrating in a first heatable flow pipe (6) up to an upper limit which is given by a creeping coverage of the inside wall with solid and/or by a total blockage of the flow cross-section and then continuing the concentrating in a second flow pipe (9) which is made as a rotary pipe or as a paddle shaft apparatus and whose inside wall (12) is scraped continuously, and separating the vapors and solids from one another at the end of this flow pipe (9).

9 Claims, 2 Drawing Sheets

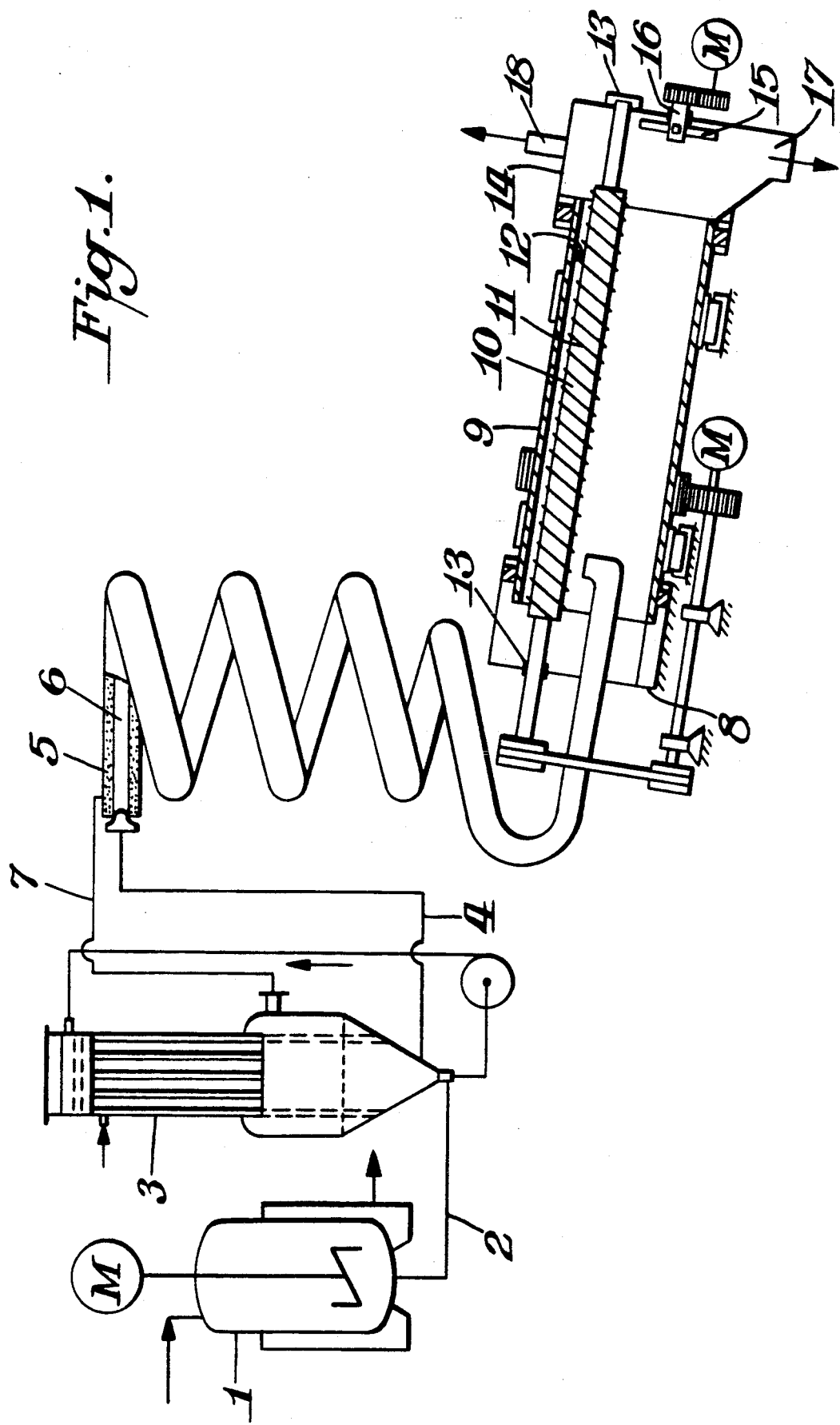

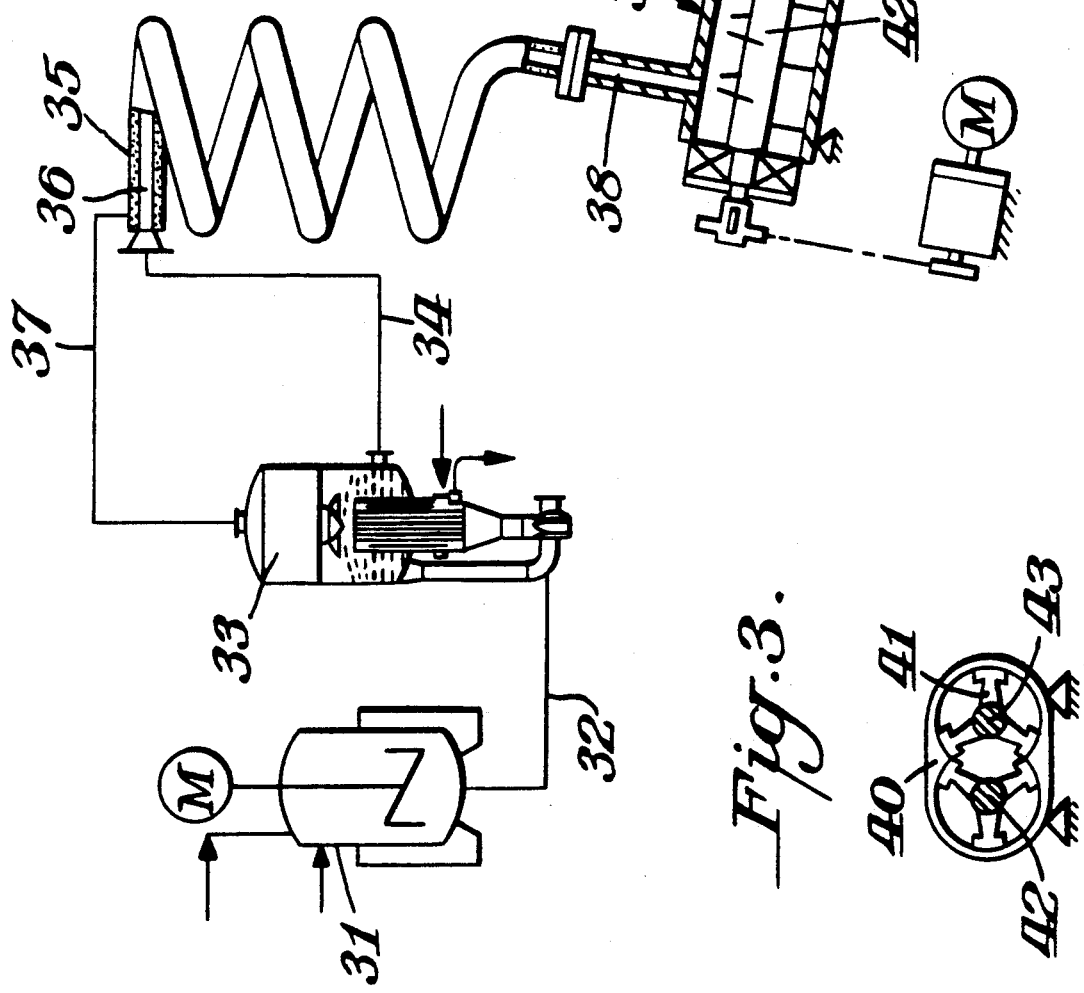

CONTINUOUS PROCESS FOR THE SEPARATION OF SOLUTIONS AND SUSPENSIONS

The invention relates to a continuous process for the separation of solutions and suspensions into a free-flowing solid and into a largely solid-free distillate, a heatable flow pipe being used.

Such separation processes are necessary in certain cases, for example for aqueous inorganic and organic suspensions, such as chromium hydroxide, colorants and Armstrong acid. These assume particular importance when used in protection of the environment and in recycling, for example in the treatment of salt-containing effluents.

Up to now, such separation processes are in general carried out in discontinuously operating types of apparatus such as, for example, stirred kettles and paddle driers.

In this case, the effort in time and costs is considerable because of the batch operation; heat transfer is poor and the entire charge passes at the same time through the highly viscous, pasty phase, that is to say large forces arise temporarily, which must be taken into account in the sizing of the apparatus. This concerns an open distillation process, that is to say, in the end phase of the process, the temperatures are very high, but the driving temperature gradients are very small. This leads to long residence times in this phase which, in the case of organic products, can entail further polymerisation associated with extensive formation of crust. The encrustations are then only removable by mining techniques. Filling and emptying of the apparatus are frequently associated with pollution of the environment.

Because of these disadvantages, continuous processes are desired. The main advantage of continuous processes is that always only a small part of the product is at one time in the problem region of the highly viscous, tacky phase, that is to say only moderate forces are needed and the risk of further polymerisation is reduced. Continuous processes which are industrially available as general state of the art, are roller drying, spray drying and mechanical thin-layer evaporation. In roller drying, a thin layer is applied to a heated rotating roller surface. The solvent evaporates during the rotation of the roller, and the solid is scraped off by means of a blade. The disadvantages in this process are the poor heat transfer, the high investment costs, the tendency of the feed nozzles to block and the open evaporation on the firm surface, which can cause pollution of the environment. In spray drying, the product is superheated and then sprayed, with the additional use of extraneous steam, into a large vessel in which the vapors are separated from the solid. The main disadvantages of the process are the high investment costs, the large excess of energy which has to be used, and the high pre-superheating of the solution. In mechanical thin-layer evaporation, a thin film is spread by means of rotating wiper blades on a vertically arranged heated pipe wall. The solution moves spirally downwards as a film. The solvent thus evaporates off. Major crusts cannot form on the walls since they are scraped off by the wipers. The main disadvantage of this process, in addition to the high investment costs and the fault susceptibility of the apparatus, is the deposition of the product on the wiper blades, which cannot be cleaned automatically. Heaps of crusts build up here, which cause the wiper blades to tear off, unless cleaning of the wiper blades is carried out at short intervals. Moreover, the outlet cone of the thin-layer apparatus is not scraped, which can entail blockages.

In EP-A-0,045,912, a process is described in which, after a flash evaporation, the solution is concentrated in a coiled continuous flow pipe up to a free-flowing solid. In this case, plug-like caking can occur on the heated walls, but these are detached again from the wall by a self-cleaning mechanism of the pipe. During the formation of the plug, pressure builds up upstream of the constriction, and in many cases this has the result that the detached plug does not disintegrate but rushes at very high speed through the lower part of the pipe and thus draws along a surge of solvent which has condensed due to the pressure build-up. This has the consequence that moist product briefly emerges from the pipe, deposits on the walls of the downstream separator and causes caking therein. In the course of time, heaps of crust thus build up in the separator, which ultimately lead to blockage of the entire separator and thus make it inoperable. With other products, creeping coverage of the heated pipe walls starts, which cannot be removed by the self-cleaning mechanism of the pipe and leads to a gradual decrease in the capacity of the pipe. The result is that the solid emerges in an increasingly more moist state from the pipe in the course of time, with the consequences in the separator which have already been described above. The process described in EP-A-0,045,912 thus does not guarantee trouble-free operation in quite a number of cases. It must therefore be improved in order to guarantee trouble-free operation even in problematic cases.

It is the object to reprocess salt-containing effluents and organic residues arising in production operations and likewise loaded with salt in such a way that the useful product is recovered as completely as possible in a pure state and the waste product causes the lowest possible landfill or incinerator costs.

This object is achieved in such a way that the concentrating of solid is carried out in this flow pipe only up to an upper limit which is given by creeping coverage of the wall of the flow pipe with solid and/or by total blockage of the flow cross-section, that the concentrating is then continued in a second heatable flow pipe, into which the first flow pipe leads at an angle, the flow cross-section of the second flow pipe being at least 50 times that of the first flow pipe, and the build-up of heaps of crust in the second flow pipe being prevented by scraping the wall, and that the solid product is finally dried to reach a free-flowing state and, at the end of the second flow pipe, the vapors produced in the two flow pipes are separated off and discharged.

The division into two stages has the particular advantage that even those products which pass through a highly viscous phase and thus have a strong tendency to cause caking can be converted from a solution into a free-flowing solid. There is no real alternative to this novel process, and the discontinuous processes are also only a temporary solution for such problematic products. It is particularly advantageous that the first flow pipe can be operated at a higher output density, since high flow velocities and large driving temperature gradients can be permitted. Moreover, it can be produced inexpensively. As a result of the first flow pipe ending or opening under an angle, the product is whirled at high energy against the inside wall of the second flow pipe. A perpendicular end is here most advantageous. The second flow pipe can be kept relatively small, since the major part of the heat required for carrying out the process is already introduced into the product in the first flow pipe. The size depends solely on the residence time which is needed for fully drying the surface of the solid, unless it were desired also to remove the moisture from the interior of the solid. In this way, this flow pipe can also be kept inexpensive. The vapors produced in the first flow pipe are passed through the second one and separated off only downstream of the second flow pipe. In order to reduce the risk of creeping coverage with sticky solid, the inside wall of the first flow pipe is preferably coated with polytetrafluoroethylene or enamel.

Preferably, as the first flow pipe, a coiled evaporator pipe is used, whose flow cross-section is made such that an exit velocity of the vapor/solid mixture of at least 50 m/second is reached.

This avoids reaching of the upper limit conditions, because the high flow velocity prevents the deposition of solids.

According to a special embodiment, coils having a pitch of at least 20° are used in the first flow pipe.

As a result, the product is distributed more uniformly in the flow pipe around the entire circumference, which reduces the risk of crust formation.

For the second flow duct, preferably a rotary pipe is used, whose inside wall is cleaned continuously by scraper blades rotating in the direction opposite to that of the rotary pipe.

Such blades are, for example, fitted to a shaft, or to sleeves which can be slipped over a shaft, and have the form of screw threads. During the rotation, their edges make brief contact with the inside wall of the rotary pipe and scrape off the inside wall of the pipe.

Further rotating scraping blades and impact blades can be arranged in the end shells.

The first flow pipe here leads into the rotary pipe under an angle, preferably perpendicularly, so that the jet of vapor and solid emerging at a high velocity is whirled against the inside wall of the rotary pipe and broken up there. The still moist solid sticks to the wall, and the vapor is deflected and loses its kinetic energy. Owing to the substantially increased cross-sectional area as compared with the first flow pipe, the vapor velocity decreases to such an extent that the solid still entrained in the vapor deposits by gravity along the length of the pipe. The already free-flowing solid product forms the rolling layer usual in a rotary pipe and thus moves towards the lower end of the rotary pipe, where it can be discharged through a lock. The still tacky product adheres in a thin layer to the heated inside wall of the pipe, is scraped off and drops into the rolling layer.

Alternatively, a paddle screw apparatus in a sloping arrangement is used.

Such an apparatus consists, for example, of a heatable housing and two shafts which rotate therein in opposite directions and whose axes are parallel to the housing axis and are fitted with obliquely arranged paddles which scrape each other and the inside wall of the housing free of crusts. The exit face of the first flow pipe is preferably perpendicular to the axes of the shafts and is substantially smaller than the free cross-sectional area of the paddle screw apparatus. In this way, the effects, already described in connection with the rotary pipe, of jet breaking, reduction of the vapor velocity and adhesion of the tacky solids to the inside wall are achieved. The inside wall of the housing is again and again scraped free of product by the paddles. At the same time, the product dried on the inside wall is comminuted by the paddles and, assisted by a slight slope of the housing axis by about 10° for example, is transported to the lower end of the paddle screw apparatus. The product which has become free-flowing in the meantime can here be discharged via a conventional lock. The vapor produced in the first and second flow pipe is also discharged at this point.

If major starting quantities with an unsaturated solids content have to be separated, at least one pre-evaporator is provided upstream of the first flow pipe.

In this way, a pre-evaporation can be carried out, so that the actual flow pipes can be utilised to a greater degree. Conventional circulation evaporators or falling-film evaporators are suitable. Such evaporators are described, for example, in Ullmanns Encyclopädie der technischen Chemie [Ullmann's Encyclopaedia of Industrial Chemistry], 1st volume, Chemischer Apparatebau und Verfahrenstechnik [Chemical equipment construction and process engineering], Verlag Urban and Schwarzenberger, Munich/Berlin, 1951, page 536 and 37. They are appropriate especially in effluent treatment.

BRIEF DESCRIPTION OF THE DRAWINGS

In the drawing, two units for carrying out the novel process are illustrated purely diagrammatically and described in more detail below. In the drawing:

FIG. 1 shows a first unit with a rotary pipe as the second flow pipe,

FIG. 2 shows a second unit with a paddle screw apparatus as the second flow pipe and FIG. 3 shows a section along line A-B in FIG. 2.

In FIG. 1, a suspension passes from a heatable vessel 1 via a line 2 into a heatable pre-evaporator 3 designed as a falling-film evaporator (Ullmann, Chemischer Apparatebau und Verfahrenstechnik [Chemical equipment construction and process engineering], 1951, Verlag Urban and Schwarzenberg, Berlin/Munich, page 537, FIG. 836).

From this pre-evaporator 3, the thickened concentrate is fed via a line 4 into a flow pipe 6 provided with a heating jacket 5 and designed as a continuous coil of 20° pitch. The vapors formed in the pre-evaporator 3 are fed as heating medium via a line 7 into the heating jacket 5. The product is concentrated further in this flow pipe 6. At a mean exit velocity of 80 m/second, this mixture of concentrate and vapors passes into the top shell 8 of a second flow pipe 9 which is designed as a rotary pipe and whose flow cross-section is 60 times that of the first flow pipe 6. The product is here whirled perpendicularly against the inside wall 12. In the rotary pipe 9, a bladed shaft 10, which is driven in the direction opposite to that of the rotary pipe 9 and whose blades 11 are of helical shape and scrape off the inside wall 12 of the rotary pipe 9, is provided about 50° after the vertex line in the direction of rotation. The bladed shaft 10 has a bearing 13 in the top shell 8 and a bearing 13 in the bottom shell 14. Within the rotary pipe 9, the product is converted into a free-flowing solid. A driven stub shaft 16 reaching into the bottom shell 14 and fitted with impact and scraper blades 15 ensures that here again no caking and lumping can occur, so that the product can be discharged without trouble through the outlet 17. The vapors leave the bottom shell 14 through an exit 18.

In FIGS. 2 and 3, a suspension passes from a heatable vessel 31 via a line 32 into a heatable pre-evaporator 33 designed as a circulation evaporator (Ullmann, see above, page 536, FIG. 835). From this pre-evaporator 33, the thickened concentrate is fed via a line 34 into a first flow pipe 36 provided with a heating jacket 35 and designed as a continuous coil of 25° pitch. The vapors produced in the pre-evaporator 33 are fed as heating medium into the heating jacket 35. The product is further concentrated in this flow pipe 36. At a mean velocity of 60 m/second, this mixture of concentrate and vapors passes through an inlet branch 38 perpendicularly into a second flow pipe 39 which is designed as a paddle screw apparatus and whose cross-section is 80 times that of the first flow pipe 36. The paddle screw apparatus 39 has a heatable housing 40, in which two shafts 42 and 43 are arranged which rotate in opposite directions, mesh with one another and are fitted with paddles 41 at angles of 10°. The paddles 41 continuously scrape off the inside wall 44 of the housing 40 and each other and in this way prevent caking and encrustations. The dried free-flowing product is discharged via an outlet 45 and the vapors leave via an exit branch 46.

EXAMPLE 1

Separation of a 50% strength aqueous Armstrong acid suspension into free-flowing Armstrong acid and water.

The unit according to FIG. 1 is used, but without a pre-evaporator.

| Throughput 25 kg/hour | |
|---|---|
| First flow pipe: | coiled flow pipe |
| Internal pipe diameter: | 15 mm |
| Flow cross-section: | 177 mm$^2$ |
| Pipe length: | 6 m |
| Coil diameter: | 250 mm |
| Pitch: | 20° |
| Heating medium: | thermally isomeric benzyl-toluenes (tradename Marlotherm oil) |
| Heating medium temperature: | 300° C. |
| System pressure: | 1 bar$_{abs}$ |
| Restrictor element at the inlet of the first flow pipe: | controlled needle valve |
| Product temperature upstream of the restrictor element: | 200° C. |
| Product temperature downstream of the restrictor element: | 160° C. |

Since the internal vapor potential is insufficient, nitrogen is also fed in, in order to reduce blockages:

| Nitrogen rate 5 kg/hour | |
|---|---|
| Second flow pipe: | rotary pipe with rotating bladed shaft |
| Rotary pipe diameter: | 200 mm |
| Rotary pipe length: | 1 m |
| Flow cross-section: | 31,000 mm$^2$ |
| Bladed shaft diameter: | 50 mm |
| Blades: | Screw thread |
| Slope of the rotary pipe: | 10° |
| Speed of rotation: | 30 rpm |
| Heating medium: | Marlotherm oil |
| Heating medium temperature: | 270° C. |

EXAMPLE 2

Separation of a 10% strength aqueous salt solution into free-flowing salt and water.

The unit according to FIG. 2 is used, but a flash evaporation is carried out in place of the pre-evaporator.

| Throughput 25 kg/hour | |
|---|---|
| First flow pipe: | coiled flow pipe |
| Internal pipe diameter: | 15 mm |
| Flow cross-section: | 177 mm$^2$ |
| Pipe length: | 6 m |
| Coil diameter: | 250 mm |
| Pitch: | 20° |
| Heating medium: | Marlotherm oil |
| Heating medium temperature: | 150° C. |
| System pressure: | 1 bar$_a$ |
| Second flow pipe: | paddle screw apparatus |
| Housing length: | 2,300 mm |
| Shaft diameter: | 45 mm |
| Peripheral circle diameter of the paddles: | 1300 mm |
| Oblique position of the paddles: | 5° |
| Pitch of the paddle screw apparatus: | 10° |
| Flow cross-section: | 13,000 mm$^2$ |
| Heating medium: | Marlotherm oil |
| Heating medium temperature: | 200° C. |
| Speed of rotation: | 160 rpm |

We claim:

1. A continuous process for thermal separation of solutions and suspensions into a free flowing solid and into a solid-free distillate comprising the steps of passing a solution and suspension into and through a first heated flow pipe for concentration only up to an upper limit which is given by creeping converge of the side wall of the first flow pipe with solid and/or by total blockage of the flow cross-section, flowing for further concentration the concentrate and vapor from an exit and of the first heated flow pipe at an angle into a second heated flow pipe having a cross-section area at least 50 times greater than the cross-sectional area of the first heated flow pipe, introducing the concentrate and vapor onto an inside wall of the second heated flow pipe, rotating the second heated flow pipe about a longitudinal axis, flowing the concentrate along the side wall toward an exit end of the second heated flow pipe, scraping the inside wall to prevent crusting of the concentrate on the wall, discharging a free-flowing solid from the exit end of the second heated flow pipe, and removing the vapors produced in the flow pipes.

2. A process as in claim 1 wherein the solution and suspension flows through the first heated flow pipe along a helical path, and wherein the concentrate and vapor exit that flow pipe at a velocity of at least 50 meters per second.

3. A process as in claim 2 wherein the helical flow path has a pitch of at least 20°.

4. A process as in claim 1 wherein scraping the inside wall of the second heated flow pipe is accomplished with a rotary blade scraper having a longitudinal axis parallel to the longitudinal axis of the second heated flow pipe, and rotating the blade scraper in a direction opposite the rotary direction of the second flow pipe.

5. A process as in claim 1 including the step of pre-evaporating the solution and suspension prior to introduction into the first heated flow pipe.

6. A continuous process for thermal separation of solutions and suspensions into a free flowing solid and into a solid-free distillate comprising the steps of passing a solution and suspension into and through a first heated flow pipe for concentration only up to an upper limit which is given by creeping coverage of the inside wall of the first flow pipe with solid and/or by total blockage of the flow cross-section, flowing for further concentration the concentrate and vapor from an exit end of the first heated flow pipe at an angle into a second heated flow pipe having a cross-section area at least 50 times greater than the cross-section area of the first heated flow pipe, introducing the concentrate and vapor onto an inside wall of the second heated flow pipe, wherein the second heated flow pipe includes a paddle screw, flowing the concentrate along the side wall toward an exit end of the second heated flow pipe, scraping the inside wall to prevent crusting of the concentrate on the wall, discharging a free-flowing solid from the exit end of the second heated flow pipe, and removing the vapors produced in the flow pipes.

7. A process as in claim 6 wherein the solution and suspension flow through the first heated flow pipe along a helical path, and wherein the concentrate and vapor exit that flow pipe at a velocity of at least 50 meters per second.

8. A process as in claim 7 wherein the helical flow path has a pitch of at least 20°.

9. A process as in claim 6 including the step of pre-evaporating the solution and suspension prior to introduction into the first heated flow pipe.

* * * * *